United States Patent

Groom et al.

[11] Patent Number: 5,540,011
[45] Date of Patent: Jul. 30, 1996

[54] FIELD TRAP FOR FLIES

[75] Inventors: Muree R. Groom, Norfolk; Colin Hawkes, Bristol; James Braven, Plymouth, all of England

[73] Assignee: W. H. Knights & Son, England

[21] Appl. No.: 244,675

[22] PCT Filed: Dec. 7, 1992

[86] PCT No.: PCT/GB92/02270

§ 371 Date: Jul. 20, 1994

§ 102(e) Date: Jul. 20, 1994

[87] PCT Pub. No.: WO93/11665

PCT Pub. Date: Jun. 24, 1993

[30] Foreign Application Priority Data

Dec. 7, 1991 [GB] United Kingdom ............... 912605701

[51] Int. Cl.[6] .................................................. A01M 1/02
[52] U.S. Cl. .................................................. 43/122; 43/107
[58] Field of Search .................................. 43/122, 107, 131, 43/121, 132.1

[56] References Cited

U.S. PATENT DOCUMENTS

| | | | |
|---|---|---|---|
| 1,787,421 | 12/1930 | Ruddell | 43/107 |
| 4,328,636 | 5/1982 | Johnson | 43/122 |
| 4,551,941 | 11/1985 | Schneidmiller | 43/107 |
| 4,642,936 | 2/1987 | Jobin | 43/122 |
| 4,794,724 | 1/1989 | Peters | 43/107 |
| 4,986,024 | 1/1991 | Peek | 43/122 |
| 5,231,791 | 8/1993 | Falkson | 43/107 |

FOREIGN PATENT DOCUMENTS

| | | | |
|---|---|---|---|
| 0102564 | 12/1937 | Australia | 43/107 |
| 0007121 | 3/1914 | United Kingdom | 43/107 |
| 2143112 | 2/1985 | United Kingdom | 43/107 |

Primary Examiner—Jack W. Lavinder
Assistant Examiner—James Miner
Attorney, Agent, or Firm—Watov & Kipnes, P.C.

[57] ABSTRACT

A species-selective field trap for flies which comprises a receptacle (1) having a removable lid (4), the receptacle forming a substantially closed chamber(s), when the lid is in place, within which a source of chemical attractant vapor attractive to the selected species of fly and unattractive to most other species of fly is positioned in use. The receptacle having a substantially opaque upper, in use, end (2, 4) which is colored as a visual attractant to the selected species of fly and having one or more small apertures (6) in a side or the lid, thereof adapted to closely accommodate passage of the selected species of fly therethrough. The apertures being the primary and preferably the only means by which the chemical attractant vapor is emitted from the receptacle.

9 Claims, 2 Drawing Sheets

5,540,011

FIELD TRAP FOR FLIES

FIELD OF THE INVENTION

The present invention relates to a field trap for selective capture of one or more species of fly primarily, but not necessarily exclusively, for analysis of fluctuations in the population of the species.

REVIEW OF MOST RELEVANT ART KNOWN TO THE APPLICANT

Field fly traps are widely used in agricultural research and pest monitoring to assess when and how best to apply insecticide sprays or adopt other measures to protect a field of crop.

The simplest traps for this purpose comprise one or more strips of brightly coloured adhesive and, optionally, insecticide-coated paper, or a simple water-containing bowl which is often brightly coloured as an attractant to flies and which may have additional surfactant to assist in drowning flies which land in the water. These traps are however non-discriminatory, the choice of attractant colour having little effect in selection of fly species, and give rise to considerable problems in subsequently discriminating between the insect corpses to identify the species in question.

A more refined prior art technique involves use of a "lobster pot" trap which comprises an open-topped pot substantially sealed, in use, by a lid but having a funnel-shaped entrance in the base thereof for entry of insects (see FIG. 1). This trap is mounted to a stake which raises it above ground level in use.

The base of the pot (B) is usually opaque while the main body and upper portions (A) of the pot are transparent. The light within the pot and any suitable chemical attractant which is placed therewithin acts to entice the flies up through the funnel entrance into the pot where it is intended that they will subsequently become disoriented and fail to find their way out again.

Whereas the lobster pot design of trap is comparatively more effective in selecting the desired species of fly than the two afore-mentioned traps, it is not reliable. This design of pot relies heavily upon the selectively attractive effect of the chemical attractant and is liable to give misleading results due to seasonal and daily variations in the heating of the pot thereby giving rise to fluctuating rates of emission of the chemical attractant which vaporises far more readily under the glare of the mid-summer sun. A further problem that arises is desiccation and embrittlement of the fly specimens.

It is a general objective of the present invention to provide a species selective fly trap which overcomes the problems of conventional traps.

SUMMARY OF THE INVENTION

A species-selective field trap for flies which comprises a receptacle having a removable lid, said receptacle forming a substantially closed chamber, when the lid is in place, within which a source of chemical attractant vapour attractive to the selected species of fly and unattractive to most other species or fly is positioned in use, and having one or more small apertures in a/the side of the lid, in use, thereof adapted to closely accommodate passage of the selected species of fly therethrough, said apertures being the primary means by which the chemical attractant vapour is emitted from the receptacle characterised in that the receptacle has a substantially opaque upper, in use, end extending for a major proportion of the height of the receptacle and which is coloured as a visual attractant to the selected species of fly.

Preferably the base, in use, of the receptacle is translucent. A shroud may be provided extending downwardly, in use, from the base.

Preferably the receptacle is partially filled with an entrapment liquid such as, for example, water and preferably also with surfactant. This liquid suitably rises within the receptacle to a level just below the aperture(s), thereby ensuring that the flies which enter are substantially immediately trapped, and further ensuring greater consistency in vapour pressure gradient from within the receptacle to the exterior.

Where the selected species of fly to be trapped is *Delia radicum*, the visual attractant colour is suitably fluorescent yellow, the chemical attractant is suitably isothio cyanate and the apertures(s) are suitably approximately 6 mm in diameter.

DESCRIPTION OF THE PREFERRED EMBODIMENTS

Figure 1:
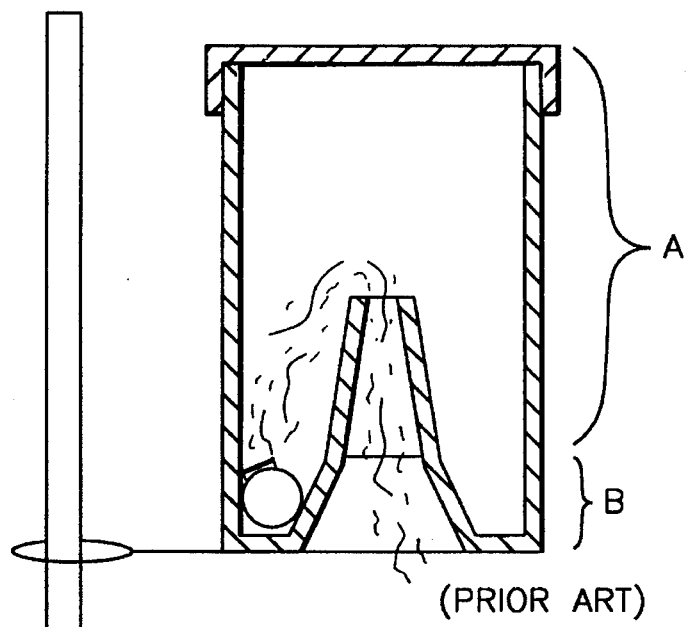
FIG. 1 is a longitudinal sectional view of a "lobster pot" trap of the prior art.
Figure 2:
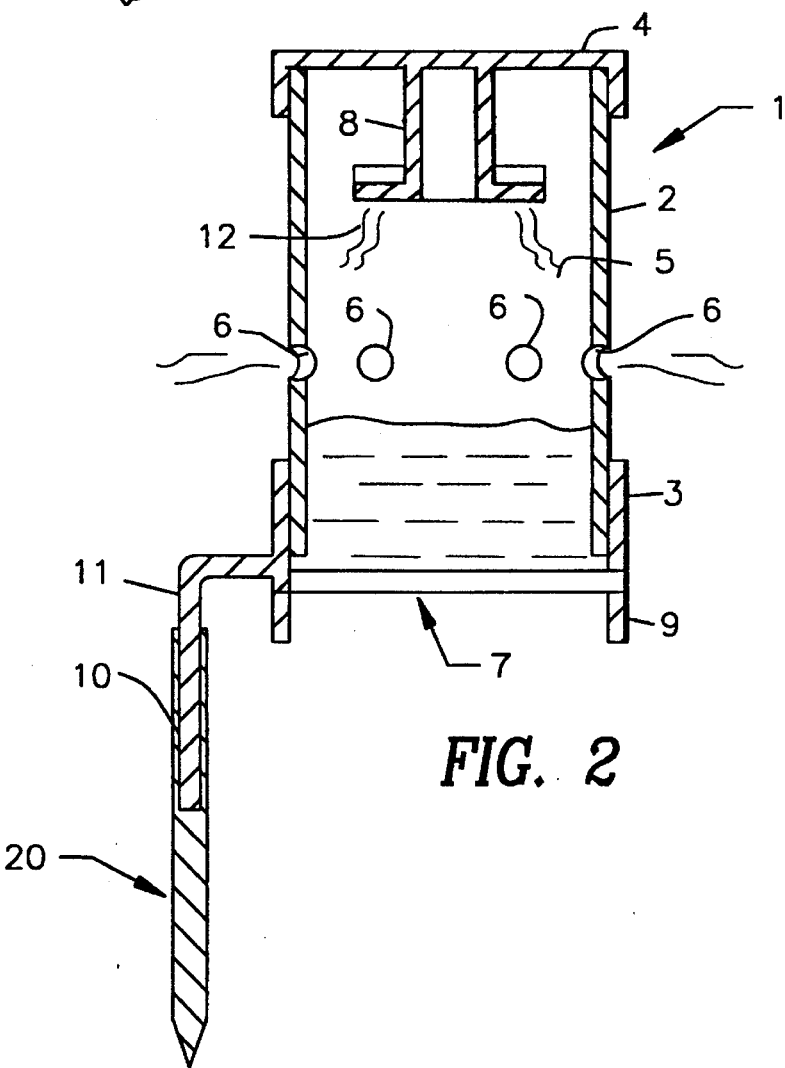
FIG. 2 is a longitudinal sectional view of a field trap according to a preferred embodiment of the present invention.

Referring to FIG. 2, there is shown a trap which comprises a receptacle 1 mounted to an upper end of a stake 2 by means of which the trap may be securely positioned above ground at any suitable location on a field to be monitored.

The receptacle 1 comprises a tubular, preferably cylindrical, body portion 2, a corresponding tubular base portion 3 which forms a friction fit within the body portion 2 and a lid portion 4 adapted to engage the upper, in use, end of the body 2 by a friction-fit to substantially seal the chamber 5 formed within the receptacle 1.

In the illustrated embodiment of FIG. 2, a row of six substantially symmetrically spaced circular apertures 6 are provided extending through the circumferential wall, or side, of the receptacle body 2. Each of the apertures 6 is of a diameter adapted to closely accommodate passage of the selected species of fly to be trapped. Extensive field trials have shown that for cabbage root fly (*Delia radicum*) an aperture diameter of approximately 6 mm is particularly effective. The diameter of the trap is suitably 65 mm.

The lid 4, body 1 and base portion 3 are entirely formed of fluorescent plastics material (yellow for *Delia radicum*) with the exception of the floor 7 of the base portion 3. The colouration renders the lid and sides of the receptacle 1 substantially opaque and provides a large prominent surface area of visual attractant to the species of fly to be trapped. This is clearly visible from above for a substantial distance. The opacity of the upper regions of the receptacle 1 greatly reduces the heating effect of direct sunlight upon the receptacle 1 and thereby reduces not only desiccation of flies trapped but also seasonal variations in emission of vapour plumes from chemical attractant placed in the chamber 5 of the receptacle 1.

Suitably substantially the whole of the surfaces of the receptacle which are normally exposed to direct sunlight are opaque. These may include the whole of the lid and vertical sides of the receptacle.

A source of a chemical attractant which is a host plant chemical or other chemical which is attractive to the target species of fly but unattractive to most other species of fly and may be positively repulsive to most other species of fly, is deposited in small regular doses upon a retaining member 8 provided extending downwardly from the inner surface of the lid 4. Four doses over a season may be appropriate. For *Delia radicum* the attractant is suitably allyl isothio cyanate. Plumes of vapour from the source are emitted substantially uniformly from the evenly spaced apertures 6 in the sides of the receptacle body portion 2.

The base portion 3 of the receptacle 1 has a shroud 9 extending downwardly therefrom which directs reflected light from beneath the receptacle 1 through the transparent floor 7 into the chamber 5 to attract flies entering the apertures 6 into the base portion 3 of the receptacle 1.

The base portion 3 is suitably filled with a translucent liquid such as water having surfactant added thereto to trap and subsequently drown the flies which have entered the chamber 5 via the apertures 6 and either accidentally touched the surface of the liquid or been attracted downwardly by the source of light.

The illustrated trap incorporates a number of features which specifically improve ease and safety of use. These features include the separability of the body portion 2 of the receptacle 1, the attractant chemical dose retaining member 8 mounted to the lid 4 and the mounting of the base portion 3 to the stake 20.

The supportive stake 20 has a hollow upper region 10 while the base portion 3 of the receptacle 1 has a leg 11 extending therefrom which may be slid into the hollow portion 10 of the stake 20. This sliding engagement enables the trap to be lifted and replaced on the stake 2 with ease whenever it is desired to empty and inspect the contents of the chamber 5. Emptying of the chamber 5 is further facilitated by the separability of the base portion 3 from the body portion 2, thereby avoiding accidental drainage of water and lots of insect specimens through the apertures 6 during emptying.

Provision of the chemical attractant retaining member 8 on the lid 4 provides simple access and reduces the need for handling of the chemical.

Figure 3:
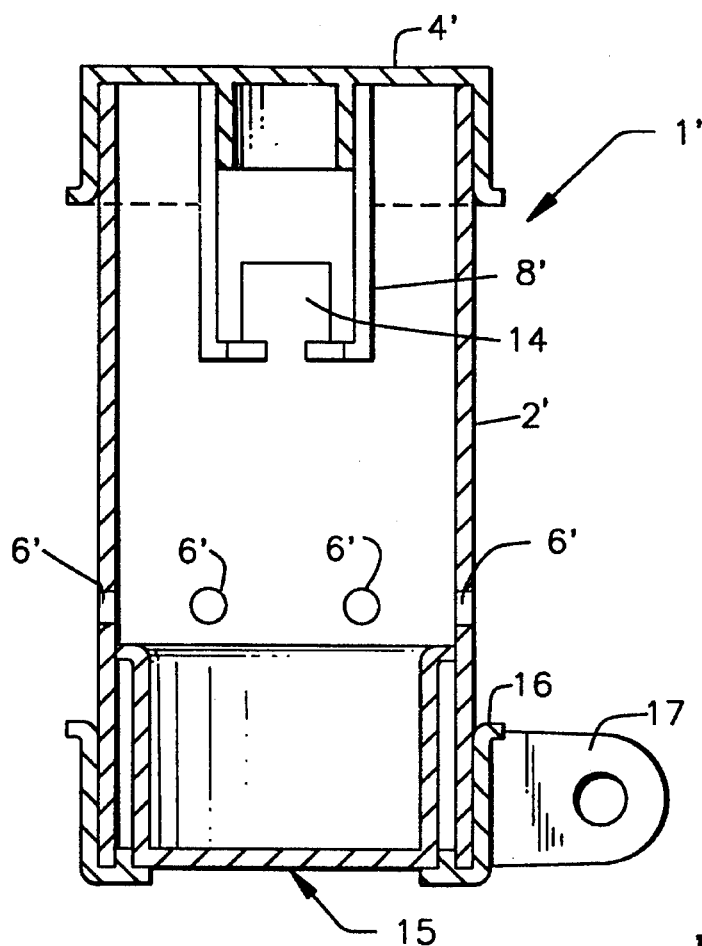
FIG. 3 is a longitudinal sectional view of the further preferred embodiment of the present invention.
Figure 4:
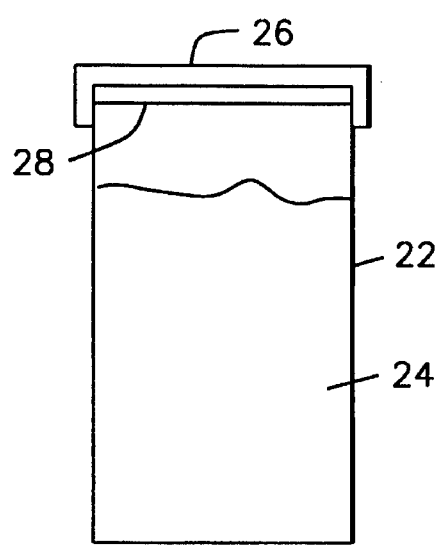
FIG. 4 is a front elevational view of a vial with flip-off lid and septum, for one embodiment of the invention.

Referring to FIG. 3, there is shown an improved version of the preferred embodiment of the invention, in which the chemical attractant dose retaining member 8 has cut outs 14 on its innermost end to enable the inner most end to splay to engage a vial 22 containing the chemical attractant 24. The vial 22 is suitably a glass vial 22 of the type used for medicaments and has a flip off lid 22 which, when removed, exposes a rubber, preferably natural rubber, septum 28. A chlorobutyl septum is usable but in most circumstances is less efficient, permitting an emission rate of allyl isothio cyanate which is approximately one quarter of that for a natural rubber septum.

The lower portion of the improved trap further differs from the embodiment of FIG. 2 in that the liquid medium is contained within a separable cup 15 of transparent plastics material. This cup 15 clips into an annular base cap 16 into which the lower most edge of the receptacle body intermediate tubular portion 2 also fits. The base cap 16 has a lug 17 projecting therefrom to provide a means of fixing the trap rigidly to a stake 20 or the like.

Preferred plastics for the construction of the top and bottom caps and the tubular receptacle body portion 2 comprise dyed ABS, amongst others. The transparent cup 15 is suitably of SAN plastics material.

The illustrated and described trap of the present invention has been proven to be outstandingly effective in selectively trapping *Delia radicum* alone when allyl isothio cyanate attractant is used in conjunction with the aperture size criterion and the appropriate fluorescent yellow colouration of the receptacle 1.

Whereas the present invention has been described above with respect to one preferred embodiment thereof and primarily for one example species of fly numerous alternative embodiments are conceivable without exercise of further inventive thought and falling within the scope of the present invention.

What is claimed is:

1. A species-selective field trap for flies which comprises a receptacle having a side wall and a removable lid for covering an open upper end, and a base, said receptacle forming a substantially closed chamber, when the lid is in place, within which a source of chemical attractant vapor attractive to the selected species of fly and unattractive to most other species of fly is positioned, the receptacle having a substantially opaque upper end which is colored as a visual attractant to a fly and having one or more apertures in the side wall thereof to accommodate passage of a fly therethrough, said apertures being the primary means by which the chemical attractant vapor is emitted from the receptacle, wherein the receptacle is adapted to minimize the heating of the content thereof, the substantially opaque upper end of the receptacle extending downwardly for the majority of the length of the receptacle, whereby the receptacle is substantially wholly protected from direct sunlight entering the receptacle, and said base being formed from material permitting greater light passage than material forming said upper end.

2. A field trap as claimed in claim 1, wherein the receptacle further includes a translucent base.

3. A field trap as claimed in claim 1, wherein a shroud is provided extending downwardly from the base.

4. A field trap as claimed in claim 1, wherein the receptacle is adapted to be partially filled with an entrapment liquid.

5. A field trap as claimed in claim 4, wherein the apertures of the receptacle are located substantially immediately above the level to which it is intended that the entrapment liquid will rise in use.

6. A field trap as claimed in claim 1, wherein the inner face of the lid of the receptacle has a retaining member for the source of chemical attractant.

7. A field trap as claimed in claim 6, wherein the retaining member is adapted to provide a snap-fit mounting for a vial containing the chemical attractant.

8. A field trap as claimed in claim 1, wherein the trap has a main body portion and a base, the base being that portion within which the flies collect, and the main body portion and the base are separable.

9. A field trap as claimed in claim 1, wherein the trap further comprises a vial containing the source of chemical attractant and said vial has a rubber septum.

\* \* \* \* \*